(12) United States Patent
Sauvage et al.

(10) Patent No.: US 8,117,051 B2
(45) Date of Patent: Feb. 14, 2012

(54) METHOD FOR DETERMINING THE NUMBER OF AVAILABLE TRANSPORT SEATS IN A COMPUTERIZED RESERVATION SYSTEM

(75) Inventors: Jean-Michel Sauvage, Nice (FR); Denis Arnaud, Nice (FR); Valerie Viale, Nice (FR)

(73) Assignee: Amadeu S.A.S., Biot (FR)

( * ) Notice: Subject to any disclaimer, the term of this patent is extended or adjusted under 35 U.S.C. 154(b) by 1022 days.

(21) Appl. No.: 10/521,965

(22) PCT Filed: Jun. 13, 2003

(86) PCT No.: PCT/FR03/50009
§ 371 (c)(1), (2), (4) Date: Jan. 21, 2005

(87) PCT Pub. No.: WO2004/010348
PCT Pub. Date: Jan. 29, 2004

(65) Prior Publication Data
US 2005/0278201 A1 Dec. 15, 2005

Related U.S. Application Data

(60) Provisional application No. 60/444,674, filed on Feb. 4, 2003.

(30) Foreign Application Priority Data

Jul. 22, 2002 (FR) .................... 02 09250

(51) Int. Cl.
*G06Q 10/00* (2006.01)
(52) U.S. Cl. .............................. 705/5; 705/6
(58) Field of Classification Search .................... 705/5–6
See application file for complete search history.

(56) References Cited

U.S. PATENT DOCUMENTS 5,255,184 A * 10/1993 Hornick et al. .................. 705/6
6,263,315 B1 * 7/2001 Talluri ......................... 705/8

OTHER PUBLICATIONS

Advance-Purchase Discounts and Monopoly Allocation of Capacity Ian L. Gale, Thomas J. Holmes The American Economic Review, vol. 83, No. 1 (Mar. 1993), pp. 135-146 Published by: American Economic Association Stable URL: http://www.jstor.org/stable/2117500.*

* cited by examiner

*Primary Examiner* — John Hayes
*Assistant Examiner* — Tonya Joseph
(74) *Attorney, Agent, or Firm* — Harrington & Smith

(57) ABSTRACT

A process for determining the number of available transport seats in a computerized reservation system, which includes elements for storing data on services that provide transportation between two locations and their current reservation status, broken down by class of service, a process in which, at a predefined level of expected revenue, a number of seats available locally for a given class of service of a transport service is determined. The following process are carried out:

selection of at least one other class of service of a transport service;
determination of the number of seats available locally for the class of service of the transport service, at the predefined level of expected revenue;
determination of an overall number of seats available for the class of service of the transport service at the predefined level of expected revenue as a function of the different numbers of seats available locally.

10 Claims, 3 Drawing Sheets

[Key: Vol = Flight]

[Key: Vol = Flight]

[Key:]
Vol = Flight

METHOD FOR DETERMINING THE NUMBER OF AVAILABLE TRANSPORT SEATS IN A COMPUTERIZED RESERVATION SYSTEM

FIELD OF THE INVENTION

This invention related to a process for determining the number of available transport seats in a computerized reservation system.

This process will find particular application for a reservation system associated with air transport. Other applications, in particular those associated with transport by rail, are not excluded from this invention, however.

BACKGROUND

In the field of air transport, more particularly, the airlines have found that, when they offer air routes that are operated several times per day, passengers often have a very specific way of reserving their tickets. For short journeys, where the return is operated in a day, passengers generally reserve the last possible flight and, when they can arrive at the airport earlier, they ask to be transferred to a flight before the one for which they have made a reservation.

The same problem arises when an airline adds a flight because it does not want to increase the capacity of another flight any more. For example, if a line is already being operated by an Airbus 400® or a Boeing 747® and the reservations have already reached the maximum capacity, the airline is obliged to add an aircraft. For this reason, a situation arises in which two flights coexist on the same route five minutes apart. In this case, the airline certainly does not want one of the flights to be full while the other still has seats available for passengers.

The computerized reservation systems currently offered to the airlines do not permit to effectively predict the behavior of certain passengers and thus to adapt to this kind of behavior in order to offer the best transport services while ensuring a maximum financial return on their flights taking into account all relevant factors, especially overbookings.

SUMMARY

The present invention permits to overcome the drawbacks of the processes known at present and, in order to do so, proposes a new process permitting the calculation of the availability capacities of aircraft (or other means of transport) while taking into account the availabilities existing on other flights.

The invention thus has the advantage of allowing the airlines to offer a seat on multiple classes of service (multiple classes of transport services on two different flights) at the same time. In particular, the inventory system itself can, according to the invention, calculate the availability on a flight, including the availability of another flight, and ensure that there is an interdependence between the reservations that are received on both of the flights. If a seat is reserved on one of the flights, the availability of the two flights will be updated; this ensures that the facility proposed here can be used in conjunction with the standard overbooking mechanisms.

In the event that a new aircraft is chartered because of limited capacity on another flight, the present invention permits to adjust the inventory system automatically in order to update the availability of both of the flights when a reservation is made on one of them. By doing so, the user is still offered the opportunity to make a reservation on one of the flights if there is availability on the other. Of course, this system may make it necessary to disclose to the passengers that this kind of transfer between two flights will be offered. If the two flights are especially close together in time, doing this ensures that the implementation of the facility of the invention will not cause any degradation in the transport service.

The determination of availability that is being proposed here can be done dynamically, i.e., every time a request is sent to the inventory databases at the request of a customer.

Other goals and advantages will become clear from the description given below of three preferred embodiments of the invention, which, however, are not limiting.

This invention relates to a process for determining the number of transport seats available in a computerized reservation system, whereby said system includes means for storing data on services that provide transport between two locations and their current reservation status, broken down by class of service, a process in which, at a predefined level of expected revenue, a number of seats locally available is determined. According to the invention, for a given class of service on a given transport service, the following steps are carried out:

at least one other class of service of a transport service is selected;

the number of locally available seats is determined for the class of service of the transport service at the predefined level of expected revenue;

an overall number of available seats is determined for the given class of service of the given transport service at the predefined level of expected revenue according to the different number of seats available locally.

Preferred variants of the process of the invention are presented below:

at least one other class of service that belongs to another transport service is selected, and the overall number of available seats is determined by adding up the numbers of seats available locally of the two classes of service;

to each class of service a boundary transfer value is assigned that corresponds to the maximum number of reservation requests for the class of service that can be transferred to seats on other classes of service;

for each class of service, a number of transferable reservation requests is determined that is equal to:
  either zero, if the number of seats available locally for said class of service is positive,
  or the inverse of the number of seats available locally for said class of service if said number is negative and its inverse is less than the boundary transfer value;
  or the boundary transfer value if the number of seats available locally is negative and its inverse is greater than or equal to said boundary transfer value;

for each class of service, a number of reservation requests that can be accepted is determined that is equal to:
  either zero, if the number of seats available locally for said class of service is less than or equal to zero;
  or the number of seats available locally for said class of service if this number is positive.

to each class of service a boundary acceptance value is assigned that corresponds to the maximum number of seats in said class of service that can be used to transfer reservation requests on other classes of service and an upper limit that is equal to the boundary acceptance value is assigned to the number of reservation requests that can be accepted.

a single other class of service that belongs to another transport service is selected;

the total acceptance capacity from the other class of service for the given class of service is determined by selecting the minimum value from the boundary transfer value of the given class of service and the number of reservation requests that can be accepted on said other class of service, the total transfer capacity on said other class of service is determined on the given class of service by selecting the minimum value from the number of transferable reservation requests for the other class of service and the number of reservation requests that can be accepted on the given class of service, the overall number of available seats is calculated by:
adding the number of seats available locally and the total acceptance capacity,
and subtracting therefrom the total transfer capacity.

a transport service chain is formed that has successive departure times and where each departure time has a selected class of service, an index i is assigned to each transport service, whereby the value of said index increases with the time of departure, for each class of service of a given transport service, the classes of service of the transport service are selected that have a lower index to which the reservation requests on the class of service of the given transport service can be transferred.

the total acceptance capacity for the class of service is determined by selecting the minimum value from the boundary transfer value of the given class of service and the sum of the numbers of reservation requests that can be accepted for the classes of service of transport services to which the given class of service can be transferred.

the total transfer capacity from all of the other classes of service to a class of service is determined from the update of the number of reservation requests that can be accepted to said class of service;

the overall number of available seats is calculated by:
adding the number of seats available locally and the total acceptance capacity,
and subtracting therefrom the total transfer capacity, the steps in the process are carried out each time there is an availability request from a customer.

BRIEF DESCRIPTION OF THE DRAWINGS

The attached drawings are given by way of example and are not limiting with respect to the invention. They represent only one embodiment of the invention and are intended as an aid in understanding it.

DETAILED DESCRIPTION

Figure 1:
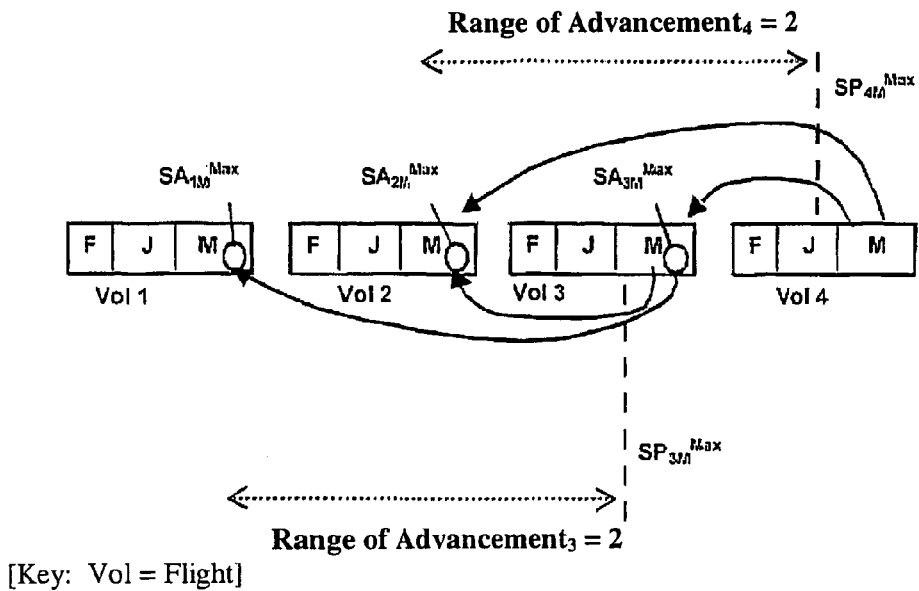
FIGS. 1 to 3 illustrate a first embodiment of the invention, in which the ability is offered to transfer reservations from a later flight to earlier flights.

For the rest of the description, "transport service" shall be defined as any individualized element permitting, in a computerized reservation system, to transport one or more users from a point of origin to a point of destination. In the specific case applying to air transport, these are flights.

Moreover, a flight can itself be composed of multiple legs, especially owing to layovers or connecting flights. In the latter case, the transport service will correspond to a leg of a journey.

Note also that the present invention can be applied as well to the transfer of a reservation from one class of service (for example, a business class) to another class of service (for example, an economy class) within the same transport service.

Moreover, for the rest of the description, the term "local availability" shall be defined as the availability that exists at a given time on a class of service of a given transport service without taking into account the reservation status of other transport services (that is, without processing the determination method of the invention). By contrast, the term "overall number of seats available" shall refer to the availabilities on a class of service of a given transport service at a given time with taking into account for the reservation status on one or more other classes of service of one or more other transport services (this therefore refers to the residual capacity on the given class of service of the given transport service after the determination process according to the invention is implemented).

In the rest of the description, three successive embodiments within the context of an air transport application will be described. In this context, the transport service is a flight leg, and the class of service consists of the class level of cabin service chosen by the user (for example, economy class or business class).

In addition, the term "expected level of revenue" shall be defined as a ticket profit value that is obtained by calculating expected profitability. The calculation of availability is understood to be dependent on the profit that the carrier desires to realize from the ticket.

The process of the invention permits to implement multiple operating scenarios.

In the first case, the invention operates by advancing a reservation. In this context, it is applicable to any number of flights that traverse the same air route at different times during the course of a day. This facility permits to take into account the behavior of the users, which consists in making reservations on the latest flights and then requesting transfers.

According to another possible embodiment of the invention, reservations are paired up between two classes of service on two different flights. In this context, a single class of service is paired between two flights; this makes it possible to access the seats available on either flight equally.

Finally, it is also possible to share a reservation, which is the case when the two flights are very close together in terms of availability. In this context, any of the classes of service on one of the flights can have access to the availability on the same class of service of another flight.

First Embodiment

Advancing a Reservation

FIG. 1 shows a case of this kind of reservation, involving four flights that are numbered, respectively, 1, 2, 3, and 4, each of which has a specified class of service that is used here to calculate the availabilities. The economy class (M) was selected here strictly by way of example.

As they are shown here, the four flights occur one after the other at different times during the day. The different arrows in the figure indicate the possible ways of advancing a reservation that constitute the transfers of reservations from later flights to earlier ones.

To each flight an index (i) is assigned that increases in value with the departure time of the flight. In the case of the example depicted here, it varies from 1 to 4.

Furthermore, it is also possible to assign to each flight a parameter that indicates the number of classes of service on earlier flights to which the reservations that are made on the corresponding class of service on the flight in question can be transferred.

For the rest of the description, this parameter shall be referred to as "range of advancement."

Looking at FIG. 1, in the case of flight 3, the range of advancement is equal to 2; this means that the reservations on the economy class M on flight 3 can be transferred to the identical classes of service M on flights 1 and 2.

Likewise, the reservations on the class of service M on flight 4 can be transferred to the corresponding classes of service on flights 2 and 3 in view of the fact that flight 4 also has a range of advancement equal to 2. Each flight in the flight chain that is thus created also has an additional parameter called the transfer limit, hereinafter $SP^{max}$. This value indicates the limit on the total number of passengers that can be transferred, in this case by advancement, from the flight leg in question to earlier flight legs.

In addition, each flight has another parameter, called the acceptance boundary value (hereinafter $SA^{max}$). The value of this parameter indicates the upper limit of the number of seats of a class of service on a specified flight that can accept the transfers obtained from other flights, in this case later flights.

In the case of the example offered here, a single class of service (in this case the economy class) on each flight has the facility to transfer by advancement. The identity of the class of service that has this facility is clearly indicated by a field in the database of the computerized reservation system.

Other parameters can also be taken into account, in particular the lower limit of expected revenue down to which a reservation transfer can be offered. This parameter permits, in particular, to ensure that access to the ability to transfer by advancement is restricted to certain users who have elevated reservation levels. If this parameter is not identified, it is assumed that any passenger is authorized to take advantage of this transfer capability.

These different parameters and others that will be presented below are controlled by the computerized reservation system manager via a graphical user interface, if necessary.

Below, a description is given of how an overall availability is calculated for a given class of service on a given flight leg at a given expected revenue level within the context of a facility for transfer by advancement.

First, a calculation is made, in the conventional fashion, of the local availability ($AV_k$) of each class of service examined on each flight in the chain.

For the class of service in question, the number of transferable reservation requests ($SP_{Fik}(Y)$) and the number of reservation requests that can be accepted ($SA_{Fik}(Y)$) are then determined.

The number of transferable reservation requests can be defined as the number of reservation requests made on the given class of service k that exceeds the physical capacity of said class of service k and that can be transferred to other flights.

Conversely, the number of reservation requests that can be accepted represents the number of seats that are still physically available on a class of service on a flight and that can be used to accommodate transferable reservation requests coming in from other flights.

It easy to see that if a given class of service has a non-zero number of transferable reservation requests, the capacity of the class of service in question is exceeded and, consequently, the number of reservation requests that can be accepted on this class of service is zero. The reverse is equally true.

Figure 2:
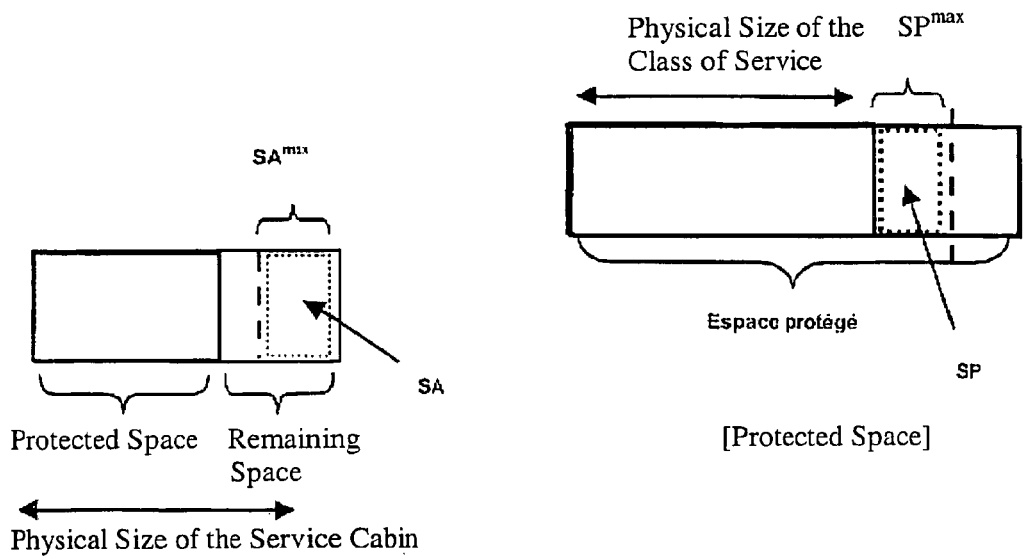

FIG. 2 illustrates the definitions of these parameters SP and SA clearly.

Upper limits are also defined on the number of transferable reservation requests (SP) and on the number of reservation requests that can be accepted (SA). In this context, the acceptance limit ($SA^{max}$) corresponds to the maximum number of seats on a given class of service that can be used to transfer reservation requests made on other classes of service (in this case, classes of service on later flights). The transfer boundary parameter ($SP^{max}$) corresponds to the maximum number of reservation requests on a given class of service that can be transferred to seats on classes of service on earlier flights.

An example is given below of how to calculate the numbers of transferable reservation requests and the number of reservation requests that can be accepted for a given expected level of revenue Y on a flight of given index $_i$ with a given class of service$_s$:

$$SP_{is}(Y) = \text{Min}\{SP_{is}^{max}, \text{Max}\{0, -AV_{is}(Y^*)\}\}$$

$$SA_{is}(Y) = \text{Min}\{SA_{is}^{max}, \text{Max}\{0, AV_{is}(Y)\}\}$$

where:

$Y^* = \text{Max}\{Y, \text{minimum-expected-transfer revenue}_{is}\}$.

In this context, the minimum expected transfer revenue$_{is}$ is the minimum expected revenue for which it is possible to make a transfer from one class of service on the flight in question. This permits to ensure that only the expected revenues above a certain level can profit by the facility to transfer from the flight in question to earlier flights.

It should be noted that the number of reservation requests that can be accepted ($SA_{is}(Y)$) is an initial value.

A parameter $EFI_i$ is then calculated for the class of service on each flight in the chain. This makes it possible to determine the index of the flight in the chain that has the earliest departure time to which the requests for reservations on the class of service on the flight in question can be transferred. The parameter $EFI_i$ is tied to the range of advancement that was presented above and is shown in FIG. 1.

If the range of advancement of the flight in question is greater than zero and $_i$ is greater than 1, $EFI_i$ is equal to max (1, $_i$- range of advancement of $_i$). If not, $EFI_i$ is equal to zero.

It is thus possible to create an ordered list of the different flights that comprise the chain according to the value of their parameter $EFI_i$.

The table below presents an example of how this table is compiled:

|  | Flight 1 | Flight 2 | Flight 3 | Flight 4 | Flight 5 | Flight 6 | Flight 7 | Flight 8 |
|---|---|---|---|---|---|---|---|---|
| Index of flight | 1 | 2 | 3 | 4 | 5 | 6 | 7 | 8 |
| Range of advancement | 0 | 0 | 0 | 0 | 3 | 1 | 2 | 7 |
| EFI | 0 | 0 | 0 | 0 | 2 | 5 | 5 | 1 |

In this case, the order of the flights according to the parameter EFI would be: flight 7, flight 6, flight 5, and flight 8.

The number of reservation requests that can be accepted (SA) on earlier flights is used to allocate the transferable reservation requests (SP) onto later flights in such a way as to optimize the possible transfers for a given flight. To do this, a calculation step is employed, an example of which is given below in reference to FIG. 3.

This step starts with the assumption that the range of advancement of each flight, which is represented here by a gray circle, is equal to 3. The flight under consideration for the calculation is indicated by the grayest circle, which appears approximately in the middle of the figure. The flights located to the left of it are earlier flights, and the flights to the right of it are later flights.

Figure 3:
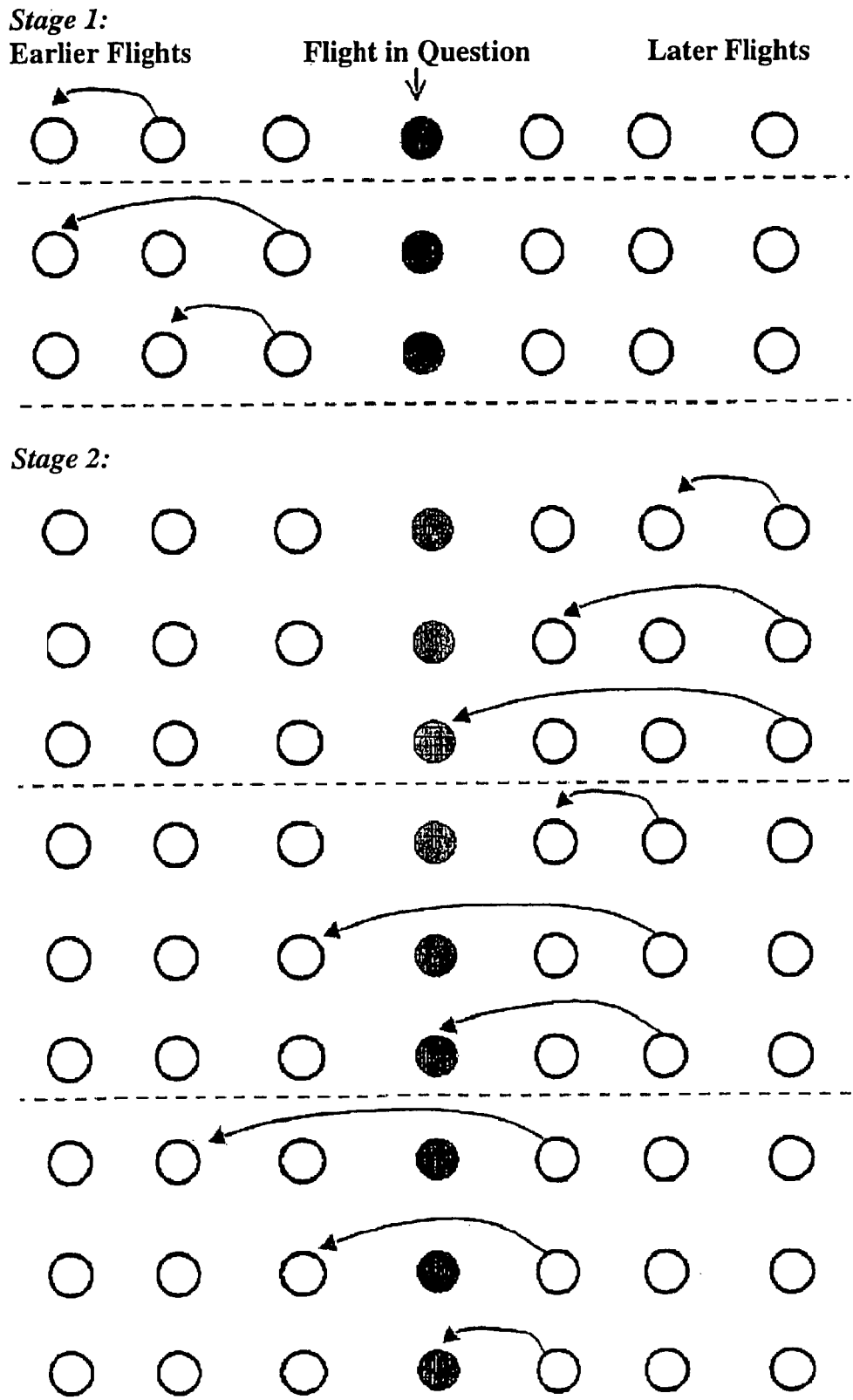

As shown at stage 1 in FIG. 3, an attempt is first made to allocate the transferable reservation requests for flights before the flight in question to other flights, within the limit of the number of reservation requests that can be accepted on the flights to which the transfers are made. The arrows in the figure indicate this allocation of reservations. It is thus possible to update and refine the values of the number of transferable reservation requests (SP) and the number of reservation requests that can be accepted (SA) for these different flights.

The flights that have later departure times than the flight in question are then considered. This is the stage marked 2 in FIG. 3.

The process begins by attempting to allocate the reservation requests that can be transferred from each of these different flights that are later than the flight in question onto flights that are earlier but that have departure time greater than or equal to that of the flight in question.

An attempt is then made to allocate the remaining transferable reservation requests onto other flights that have earlier departure times. At this point, all of the possible transfers of flights have been made that fall within the framework of the flight in question, such that their SA and SP parameters are updated.

At this point, the allocation of the transferable reservation requests for the flight in question has not yet been processed. At the end of this calculation, however, the values of the numbers of reservation requests that can be accepted for the class of service in question on other flights are known, so as to make it possible to transfer the transferable reservation requests for the flight in question.

It is then possible to calculate the total acceptance capacity ($TSA_{ns}(Y)$) for the class of service$_s$ at the given expected revenue Y for the flight in question$_n$ based on the flights that have earlier departure times than the flight in question$_n$ and to which the reservation requests can be transferred.

The following calculation can be carried out for this purpose:

$$TSAns(Y) = \text{Min}\left\{SPns\text{max}, \sum_{k=EFln}^{n-1} SA_{ks}(Y)\right\}$$

It is then possible to calculate the total transfer capacity ($TSP_{ns}(Y)$), which is the total number of reservation requests from later flights that can be transferred to the flight in question$_n$.

This total capacity is given by updating the number of reservation requests that can be accepted (SA) for the flight in questions during the transfer allocation stage described above in reference to FIG. 3.

Indeed, the capacity $TSP_{ns}(Y)$ is equal to the initial value of the number of reservation requests that can be accepted ($SA_{ns}^0(Y)$), minus the updated value of this number of reservation requests that can be accepted ($SA_{ns}(Y)$).

Finally, the values TSA and TSP permit to calculate the overall number of available seats $XFAV_{ns}(Y)$ for the flight in questions.

This number is given by the following expression:

$$XFAV_{ns}(Y)=AV_{ns}(Y)+TSA_{ns}(Y)-TSP_{ns}(Y).$$

Second Embodiment

Pairing Up of Flights

According to this embodiment, identical classes of service k, k' are considered on two flights only.

Figure 4:
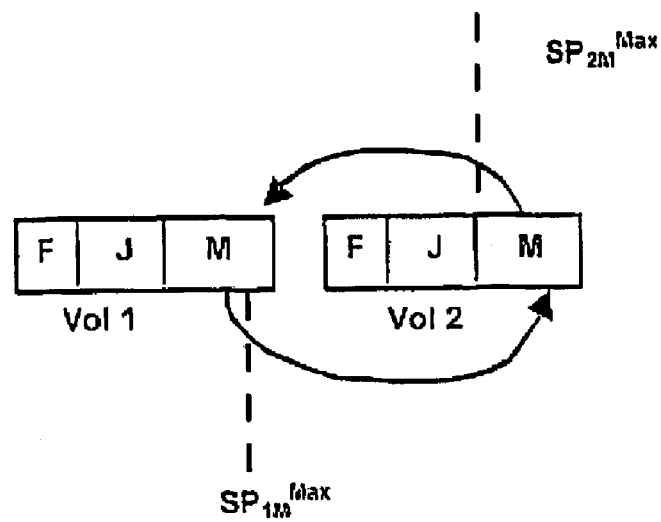
FIGS. 4 and 5 illustrate two other embodiments of the invention, in which an interdependence is established between the reservations made on two flights.

This particular embodiment is illustrated in FIG. 4, where arrows have been used to represent the options for reciprocal transfers between the economy class M of flight 1 and the economy class M on flight 2.

As in the case of the first embodiment, the parameter $SP^{max}$ and optionally parameters associated with the boundary expected level of revenue are used to permit the facility of transfer reservations. The parameter $SA^{max}$ is not used because it is redundant with the parameter $SP^{max}$ of the paired class of service.

An example is given below of how the overall number of available seats for a flight (in this case flight 1, F1) is determined for the economy class M at a predefined level of expected revenue Y.

In this context, the first step is to identify the flight F2 with which the flight F1 is paired. This can be done by means of a special field that defines the identity of the flight that is paired for flight F1.

The local availabilities are then calculated for the classes of service M in question for the two flights F1, F2.

Hereinafter, these local availabilities are written $av_{f1k}(Y)$ and $av_{f2k}(Y)$.

This calculation step is similar to that carried out for the first embodiment. In particular, standard calculation procedures are used for determining local availability.

It is then possible to calculate the parameters of the number of transferable reservation requests and the number of reservation requests that can be accepted (SA and SP) for the classes of service M on the flights in question.

For each of the two flights F1, F2, the calculation is as follows:

$$SP_{is}(Y)=\text{Min}\{SP_{is}^{max}, \text{Max}\{0, -av_{is}(Y^*)\}\}$$

$$SA_{is}(Y)=\text{Min}\{0, \text{Max}\{0, av_{is}(Y)\}\}$$

where:
  $Y^*=\text{Max}\{Y, \text{minimum-expected-transfer revenue}_{is}\}$.

It is then possible to calculate the total acceptance capacity $TSA_{1s}(Y)$ on the paired flight F2 that is available for the transfers of the class of service$_s$ on the flight in question $F_1$. This capacity is given by:

$$TSA_{1s}(Y)=\text{Min}\{SP_{1s}^{max}, SA_{2s}(Y)\}.$$

It is then possible to calculate the total capacity for transfer onto the flight F1 in question from the class of service$_s$ of the paired flight F2. This capacity is given by:

$$TSP_{1s}(Y)=\text{Min}\{SP_{2s}(Y), SA_{1s}(Y)\}.$$

Finally, it is possible to determine the overall number of available seats $XFAV_{1s}(Y)$ for the flight F1 for the class of service$_s$ in question at the predefined level of expected revenue Y.

This overall number is given by the following formula:

$$XFAV_{1s}(Y) = AV_{1s}(Y) + TSA_{1s}(Y) - TSP_{1s}(Y).$$

Third Embodiment

Reservation Sharing

Below, another embodiment of the invention is presented in the case of shared flights and where the transfer of reservations is not limited to a given class of service on the flights.

The number of transferable reservation requests and the number of reservation requests that can be accepted are not constrained in this case by the boundary values $SA^{max}$, $SP^{max}$.

As in the case of the second embodiment, only two flights are considered.

Figure 5:
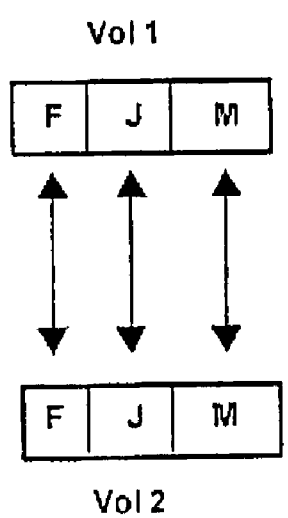

The principle of cooperation between the two flights is depicted in FIG. 5.

The first step is to calculate the number of seats available locally for each of the two flights F1 and F2 for a class of service k in question. The overall number of seats available for the class of service k in question at the predefined level of expected revenue Y is then given by the sum of the local availabilities according to the formula:

$$XFAV_{1k}(Y) = av_{1k}(Y) + av_{2k}(Y).$$

The invention claimed is:

1. A method for determining a number of transport seats available in a computerized reservation system that comprises means for storing data on services that provide transportation between two locations and their current reservation status, broken down by class of service, the method comprising:

receiving an availability request at a computer system for at least one seat on a given transport service ($F_i$) between the two locations;

in response to receiving the availability request, determining at the computer system, at a predefined level of expected revenue (Y), a number of seats locally available $av_{Fik}(Y)$ for the given class of service (k) on the given transport service ($F_i$) between said two locations;

selecting at least one other class of service (k') of another transport service ($F_j$) between said two locations;

determining at the computer system the number of locally available seats $av_{Fjk}(Y)$ for the class of service (k') of the another transport service ($F_j$) at the predefined level of expected revenue (Y);

determining, for the given class of service (k) on the given transport service ($F_i$), an overall number of available seats $XFAV_{Fik}(Y)$ at the predefined level of expected revenue (Y) as a function of the numbers of locally available seats ($av_{Fik}Y$) $av_{Fjk}(Y)$) determined for the given transport service ($F_i$) and the at least another transport service ($F_j$) between said two locations, where the given transport service ($F_i$) between said two locations is a journey consisting only of a single leg;

using the overall number of available seats $XFAV_{Fik}(Y)$ as an availability capacity when considering the availability request for the given class of service (k) on the given transport service ($F_i$) between said two locations, and replying favorably to the availability request upon the overall number of available seats $XFAV_{Fik}(Y)$ being sufficient to serve the requested at least one seat, where the method executed by the computer system further comprises assigning to each class of service a boundary transfer value ($SP^{max}$);

using the boundary transfer value ($SP^{max}$) as the maximum number of reservation requests for the class of service transferrable to seats on other classes of service;

for each class of service, a number of transferable reservation requests (SP(Y)) is determined that is equal to:

either zero, if the number of seats available locally for said class of service (k) is positive, or the inverse of the number of seats available locally for said class of service (k) if said number is negative and its inverse is less than the boundary transfer value ($SP^{max}$);

or the boundary transfer value ($SP^{max}$) if the number of seats available locally is negative and its inverse is greater than or equal to said boundary transfer value ($SP^{max}$);

for each class of service an acceptable number of reservation requests (SA(Y)) is determined that is equal to:

either zero, if the number of seats available locally for said class of service av(Y) is less than or equal to zero;

or the number of seats available locally for said class of service $av_k(Y)$ if this number is positive; and where a total acceptance capacity $TSA_{Fik}(Y)$ for the class of service (k) is determined by selecting the minimum (Min) value from the boundary transfer value ($SP_{Fik}^{max}$) of the given class of service (k) and a summation ($\Sigma$) of the numbers of acceptable reservation requests ($SA_{Fjk}(Y)$) for the classes of service (k') of transport services (Fj) to which the given class of service (k) is transferrable, in accordance with:

$$TSAns(Y) = \text{Min}\left\{SPns \text{ max}, \sum_{k=EFln}^{n-1} SA_{ks}(Y)\right\}.$$

2. The method according to claim 1, wherein:
the overall number of available seats $XFAV_{Fik}(Y)$ is determined by adding up the numbers of seats available locally ($av_{Fik}(Y)$, $av_{Fjk}(Y)$) determined for the given transport service ($F_i$) and the at least another transport service ($F_j$) between said two locations.

3. The method according to claim 1, wherein:
to each class of service a boundary acceptance value ($SA^{max}$) is assigned that corresponds to the maximum number of seats in said class of service useable to transfer reservation requests on other classes of service;
an upper limit that is equal to the boundary acceptance value ($SA^{max}$) is assigned to the number of acceptable reservation requests.

4. The method according to claim 1, wherein:
a single other class of service (k') that belongs to another transport service ($F_j$) is selected;
the total acceptance capacity ($TSA_k$) from the other class of service (k') for the given class of service (k) is determined by selecting the minimum value from the boundary transfer value ($SPF_{jk}^{max}$) of the given class of service (k) and the number of acceptable reservation requests ($SA_{Fjk}(Y)$) on said other class of service (k'), the total transfer capacity ($TSP_k$) on said other class of service (k') is determined on the given class of service (k) by selecting the minimum value from the number of transferable reservation requests for the other class of service (k') ($SP_{Fjk}(Y)$) and the number of acceptable reservation requests on the given class of service (k) ($SA_{Fjk}(Y)$), the overall number of available seats $XFAV_{Fik}(Y)$ is calculated by:

adding the number of seats available locally $av_{Fik}(Y)$ and the total acceptance capacity $TSA_{Fik}(Y)$, and subtracting therefrom the total transfer capacity $TSP_{Fik}(Y)$.

5. The method according to claim 3, wherein:
a transport service chain (Fi) is formed that has successive departure times and where each departure time has a selected class of service (k, k'), an index i is assigned to each transport service, whereby the value of said index increases with the time of departure, for each class of service (k) of a given transport service (Fi), the classes of service (k') of the transport service are selected that have a lower index to which the reservation requests on the class of service of the given transport service (Fi) are transferrable.

6. The method according to claim 1, wherein:
the total transfer capacity $TSP_{Fik}$ from all of the other classes of service to a class of service (k) is determined from the update of the number of acceptable reservation requests to said class of service (k).

7. The method according to claim 6, wherein:
the overall number of available seats $XFAV_{Fik}(Y)$ is calculated by:
adding the number of seats available locally $av_{Fik}(Y)$ and the total acceptance capacity $TSA_{Fik}(Y)$, and subtracting therefrom the total transfer capacity $TSP_{Fik}(Y)$.

8. The method according to claim 1, wherein:
the steps in the process are carried out each time there is an availability request from a customer.

9. The method according to claim 5, wherein:
the total transfer capacity $TSP_{Fik}$ from all of the other classes of service to a class of service (k) is determined from the update of the number of acceptable reservation requests to said class of service (k).

10. A method for determining a number of transport seats available in a computerized reservation system that comprises means for storing data on flights between locations, the method comprising:
receiving an availability request at a computer system for at least one seat on a first flight ($F_i$) between two locations;
in response to receiving the availability request, determining at the computer system, at a predefined level of expected revenue (Y), a number of seats locally available $av_{Fik}(Y)$ for a given class of service (k) on a flight leg of the first flight ($F_1$) between the two locations;
selecting at least one other class of service (k') of a second flight ($F_j$) between the two locations;
determining at the computer system a number of locally available seats $av_{Fkj}(Y)$ for the class of service (k') on a flight leg of the second flight ($F_j$) between the two locations, at the predefined level of expected revenue (Y);
determining at the computer system, for the given class of service (k) on the flight leg of the first flight ($F_i$), an overall number of available seats at the predefined level of expected revenue (Y) as a sum of the numbers of locally available seats ($av_{Fik}(Y)$, $av_{Fjk}(Y)$) that were determined for the flight leg of the first flight between the two locations and for the flight leg of the second flight between the two locations;
using the determined overall number of available seats as an availability capacity when considering an availability request for the given class of service (k) on the flight leg of the first flight ($F_i$) between the two locations; and
replying favorably to the availability request upon the overall number of available seats being sufficient to serve the availability request, where the method executed by the computer system further comprises assigning to each class of service a boundary transfer value ($SP^{max}$);
using the boundary transfer value ($SP^{max}$) as the maximum number of reservation requests for the class of service transferrable to seats on other classes of service;
for each class of service, a number of transferable reservation requests (SP(Y)) is determined that is equal to:
either zero, if the number of seats available locally for said class of service (k) is positive, or the inverse of the number of seats available locally for said class of service (k) if said number is negative and its inverse is less than the boundary transfer value ($SP^{max}$);
or the boundary transfer value ($SP^{max}$) if the number of seats available locally is negative and its inverse is greater than or equal to said boundary transfer value ($SP^{max}$);
for each class of service, an acceptable number of reservation requests (SA(Y)) is determined that is equal to:
either zero, if the number of seats available locally for said class of service $av(Y)$ is less than or equal to zero;
or the number of seats available locally for said class of service $av_k(Y)$ if this number is positive; and where
a total acceptance capacity $TSA_{Fik}(Y)$ for the class of service (k) is determined by selecting the minimum (Min) value from the boundary transfer value ($SP_{Fik}^{max}$) of the given class of service (k) and a summation ($\Sigma$) of the numbers of acceptable reservation requests ($SA_{Fik}(Y)$) for the classes of service (k') of transport services (Fj) to which the given class of service (k) is transferrable, in accordance with $$TSAns(Y) = \text{Min}\left\{SPns \max, \sum_{k=EFln}^{n-1} SA_{ks}(Y)\right\}.$$

* * * * *

UNITED STATES PATENT AND TRADEMARK OFFICE
CERTIFICATE OF CORRECTION

PATENT NO. : 8,117,051 B2
APPLICATION NO. : 10/521965
DATED : February 14, 2012
INVENTOR(S) : Sauvage et al.

It is certified that error appears in the above-identified patent and that said Letters Patent is hereby corrected as shown below:

Claim 1, col. 9, line 46 delete "$av_{Fik'}(Y)$" and insert -- $av_{Fjk'}(Y)$ --.

Claim 1, col. 9, line 58 delete "$XFAV_{FIk}(Y)$" and insert -- $XFAV_{Fik}(Y)$ --.

Claim 1, col. 10, line 26 delete "$(SA_{Fik'}(Y))$" and insert -- $(SA_{Fjk'}(Y))$ --.

Claim 4, col. 10, line 66 delete "$XFAV_{Fik}(Y)$" and insert -- $XFAV_{Fjk}(Y)$ --.

Claim 10, col. 11, line 44 delete "$(F_1)$" and insert -- $(F_i)$ --.

Claim 10, col. 11, line 46 delete "$(F_1)$" and insert -- $(F_i)$ --.

Claim 10, col. 12, line 2 delete "$(av_{Fik}(Y), av_{Fik'}(Y))$" and insert -- $(av_{Fij}(Y), av_{Fij'}(Y))$ --.

Claim 10, col. 12, line 42 delete "$(SA_{Fik'}(Y))$" and insert -- $(SA_{Fjk}(Y))$ --.

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,117,051 B2 |
| APPLICATION NO. | : 10/521965 |
| DATED | : February 14, 2012 |
| INVENTOR(S) | : Sauvage et al. |

It is certified that error appears in the above-identified patent and that said Letters Patent is hereby corrected as shown below:

On the title page item (73) Assignee please delete "Amadeu S.A.S." and insert
-- Amadeus S.A.S. --.

Signed and Sealed this
Third Day of July, 2012

David J. Kappos
*Director of the United States Patent and Trademark Office*